O. KORN.
VISUAL SIGNAL FOR AUTOMOBILES.
APPLICATION FILED SEPT. 27, 1917.

1,272,969.

Patented July 16, 1918.
2 SHEETS—SHEET 1.

Witness
Fenton S. Belt
A. L. Hoyt

Inventor
Oscar Korn
By Franklin N. Hoyt
Attorney

O. KORN.
VISUAL SIGNAL FOR AUTOMOBILES.
APPLICATION FILED SEPT. 27, 1917.

1,272,969.

Patented July 16, 1918.
2 SHEETS—SHEET 2.

Witness
Fenton N. Belt
A. L. Hoyt

Inventor
Oscar Korn
By Frank H. Hoyt
Attorney

UNITED STATES PATENT OFFICE.

OSCAR KORN, OF DETROIT, MICHIGAN.

VISUAL SIGNAL FOR AUTOMOBILES.

1,272,969.

Specification of Letters Patent.  Patented July 16, 1918.

Application filed September 27, 1917. Serial No. 193,535.

*To all whom it may concern:*

Be it known that I, OSCAR KORN, a citizen of the United States, residing at Detroit, in the county of Wayne and State of Michigan, have invented certain new and useful Improvements in Visual Signals for Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in visual signals for use upon automobiles and consists essentially in the provision of a device of this nature so arranged that the operator may, through electrically controlled means, cause lights to be turned on to indicate the direction that the automobile is about to turn or stop.

The invention consists of a simple and efficient device of this nature having various details of construction combinations and arrangements of parts which will be hereinafter fully described and then specifically defined in the appended claim.

My invention is illustrated in the accompanying drawings, which with the letters of reference marked thereon form a part of this specification and in which.

Figure 1:
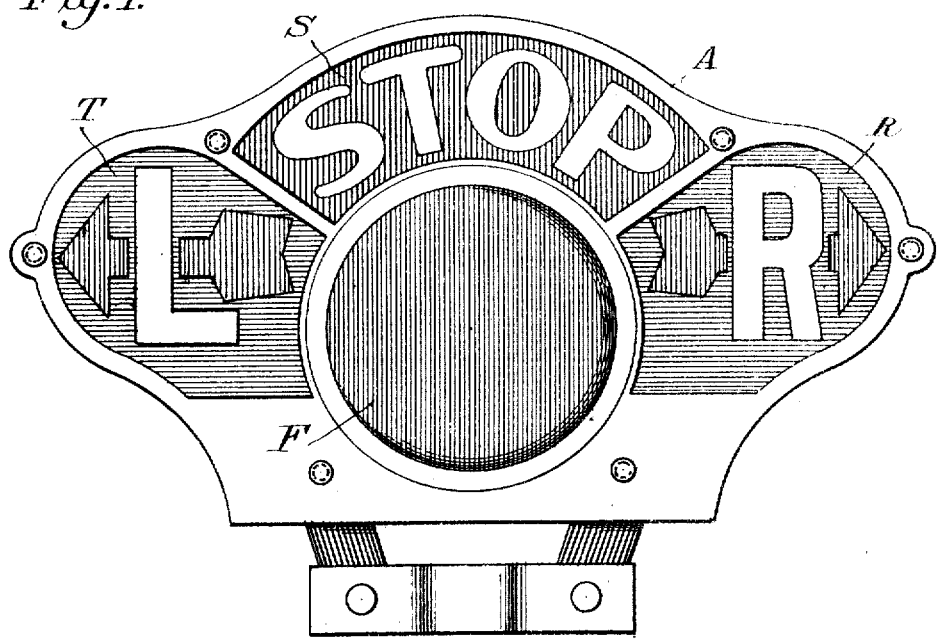
Figure 1 is a face view of the visual signal.
Figure 2:
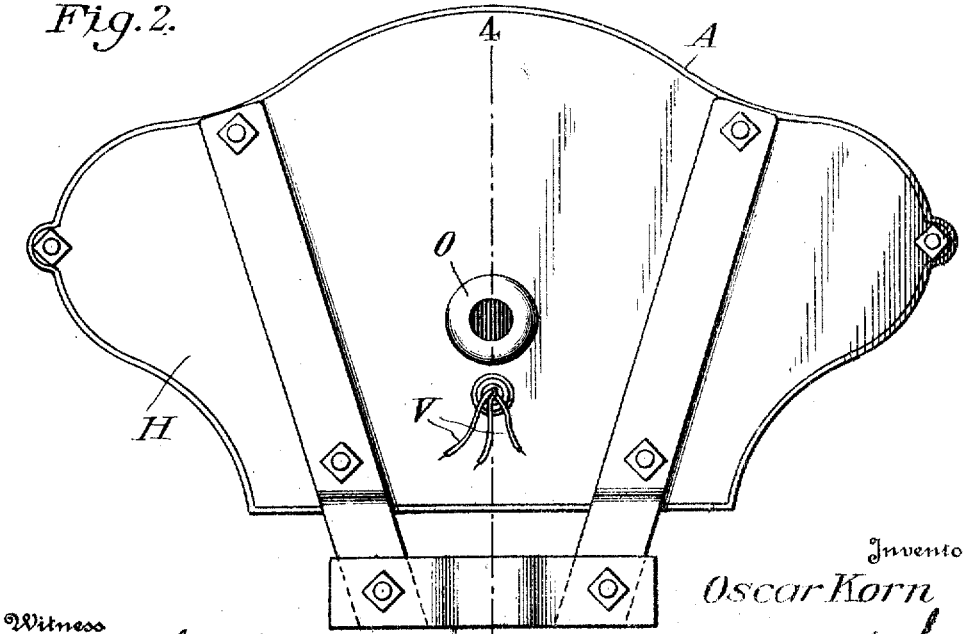
Fig. 2 is a vertical central sectional view through the apparatus.
Figure 3:
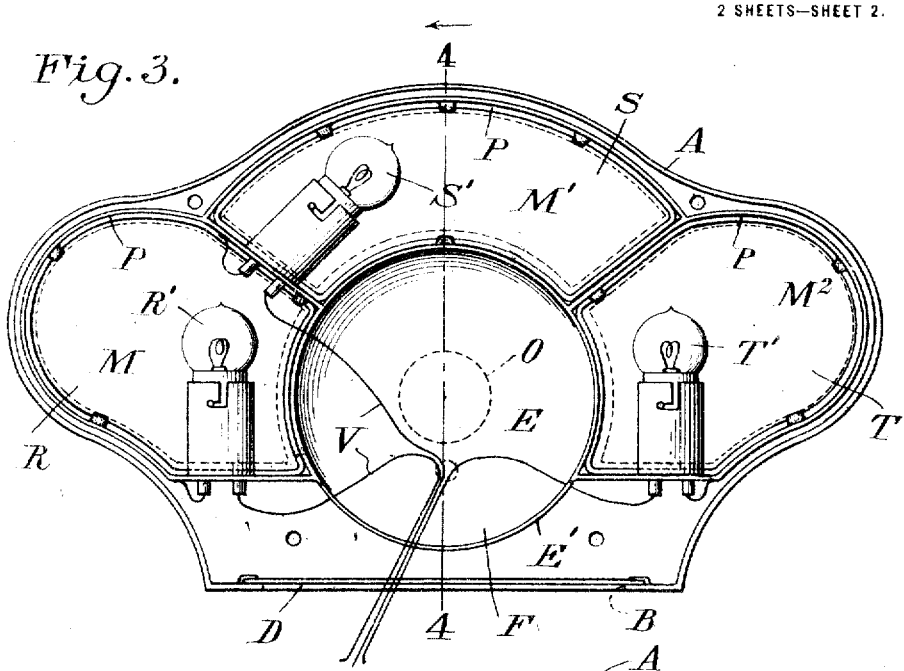
Fig. 3 is a sectional view on line 3—3 of Fig. 1.
Figure 4:
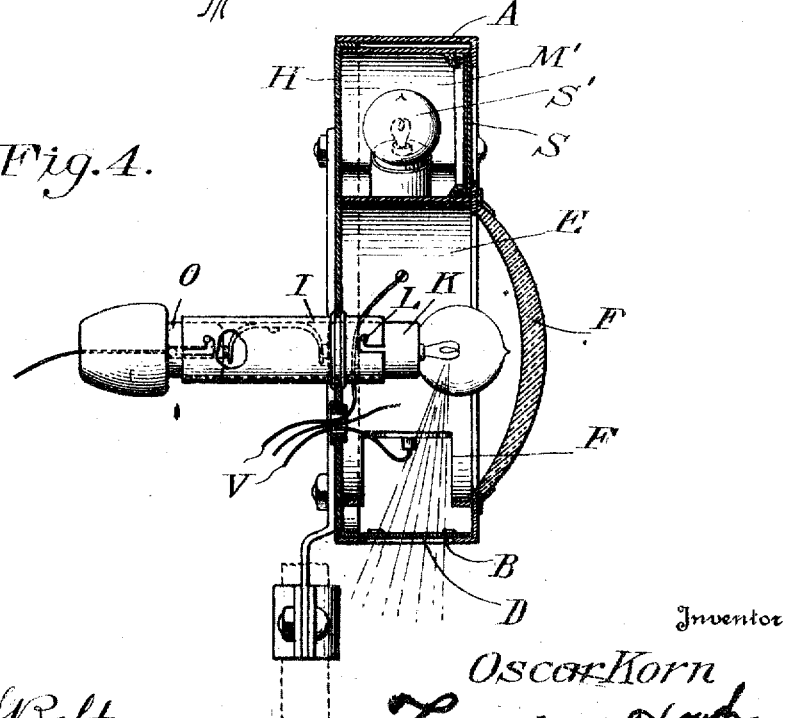
Fig. 4 is a sectional view on line 4—4 of Fig. 2.

Reference now being had to the details of the drawings by letters:

A designates a casing of the signal which may be of any shape or size, preferably as shown in the drawings, and which is provided with an elongated slot B in the bottom thereof, which is covered by means of a sheet of transparent material D. Said casing has a centrally disposed, cylindrical outlined compartment E having a colored glass F forming a closure to one end thereof. H designates a removable back to the casing forming a closure to said cylindrical outlined compartment. Said back has a tubular shell I exiting through an opening therein and the ends of said shell are provided with bayonet slots, one end of the shell being adapted to receive a socket K of an electric bulb having a pin L thereon for engagement with said slot, while the other end of said shell is adapted to receive a plug O to which electric wiring is adapted to be attached.

The wall of said cylindrical casing has an elongated slot or opening E' therein in registration with the slot in the bottom of the casing and through which white light from the bulb may be reflected, which is adapted to illuminate the license card upon the machine.

Other compartments within the casing are designated respectively by letters M, M' and M². In each compartment are frames, designated by letter P made of wire and conforming to the shapes of the compartments and which form backing for the sheets of translucent material R, S and T, the former of which has the letter "R" and an arrow appearing thereon, as shown in Fig. 1 of the drawings, indicating that when the lamp R' within the compartment M is lighted, the light will illuminate the letter "R" and the arrow to indicate that the vehicle carrying the visual signal is to turn to the right. A bulb T' is mounted in the compartment M² and is adapted, when the current is turned on, to illuminate a sheet of material bearing the letter "L" and an arrow, to indicate that the vehicle is to turn to the left. The compartment M', which is directly over the central cylindrical compartment, has a bulb S' mounted therein for the illumination of the sheet of material forming the wall of the compartment and which bears the word "Stop", for the purpose of indicating that when the bulb S' is turned on, visual signal is given to following automobiles that the vehicle carrying the signal is to come to a stop.

The various bulbs are electrically connected through suitable wiring V with a switch within convenient control of the operator of the vehicle so that the lights may be regulated.

What I claim to be new is:

A visual signal for automobiles, comprising a casing having a central cylindrical outlined compartment, and a plurality of frames with their walls adjacent to the wall of the central compartment concaved, the walls of said frames being in contact with one another, and lugs projecting from the edges of said frames, sheets of translucent material held by said lugs against the marginal edges of said frames, and lamps mounted upon said frames behind the said translucent sheets.

In testimony whereof I hereunto affix my signature in presence of two witnesses.

OSCAR KORN.

Witnesses:
A. H. MOODY,
R. L. ANDERSON.